United States Patent
Li et al.

(10) Patent No.: US 9,607,385 B2
(45) Date of Patent: Mar. 28, 2017

(54) ADJUSTING MONITORED REGION IN TRACKING SCAN

(71) Applicant: NEUSOFT MEDICAL SYSTEMS CO., LTD., Shenyang (CN)

(72) Inventors: Shuangxue Li, Shenyang (CN); Shanshan Lou, Shenyang (CN)

(73) Assignee: NEUSOFT MEDICAL SYSTEMS CO., LTD., Liaoning (CN)

( * ) Notice: Subject to any disclaimer, the term of this patent is extended or adjusted under 35 U.S.C. 154(b) by 9 days.

(21) Appl. No.: 14/849,461

(22) Filed: Sep. 9, 2015

(65) Prior Publication Data

US 2016/0071283 A1 Mar. 10, 2016

(30) Foreign Application Priority Data

Sep. 9, 2014 (CN) .......................... 2014 1 0455262

(51) Int. Cl.
*G06K 9/00* (2006.01)
*G06T 7/00* (2017.01)

(52) U.S. Cl.
CPC .... *G06T 7/003* (2013.01); *G06T 2207/10081* (2013.01)

(58) Field of Classification Search
None
See application file for complete search history.

(56) References Cited

U.S. PATENT DOCUMENTS

| | | | |
|---|---|---|---|
| 2004/0034269 A1* | 2/2004 | Ozaki | G21K 1/04 600/1 |
| 2006/0074296 A1* | 4/2006 | Dumoulin | A61B 5/055 600/424 |
| 2011/0102549 A1* | 5/2011 | Takahashi | A61C 1/084 348/46 |
| 2011/0263973 A1* | 10/2011 | Bernhardt | A61B 6/481 600/431 |
| 2013/0004046 A1* | 1/2013 | Nakano | A61B 3/102 382/131 |
| 2013/0066198 A1 | 3/2013 | Grant et al. | |
| 2013/0229622 A1* | 9/2013 | Murase | A61B 3/0033 351/206 |
| 2014/0093030 A1 | 4/2014 | Mukumoto et al. | |

(Continued)

FOREIGN PATENT DOCUMENTS

| | | |
|---|---|---|
| CN | 1579324 A | 2/2005 |
| CN | 1620988 A | 6/2005 |

(Continued)

*Primary Examiner* — Shervin Nakhjavan
(74) *Attorney, Agent, or Firm* — B. Anna McCoy

(57) ABSTRACT

A method and device for adjusting a monitored region in a tracking scan, comprising: selecting a best match of a positioned image from tracked image(s) as a monitored layer image so as to reduce position deviation of the monitored layer image with respect to the positioned image in a direction perpendicular to a plane on which the positioned image is located; and adjusting a position of a second monitored region on the monitored layer image according to a position of a corresponding first monitored region selected from the positioned image so as to reduce position deviation of the second monitored region with respect to the first monitored region in a plane parallel to the plane on which the positioned image is located.

16 Claims, 4 Drawing Sheets

(56) References Cited

U.S. PATENT DOCUMENTS

2015/0297157 A1* 10/2015 Mukumoto .......... A61B 6/5205
378/15
2016/0279444 A1* 9/2016 Schlosser ............. A61N 5/1049

FOREIGN PATENT DOCUMENTS

| | | | |
|---|---|---|---|
| CN | 101299967 | A | 11/2008 |
| CN | 101411620 | A | 4/2009 |
| CN | 101856239 | A | 10/2010 |
| CN | 102421369 | A | 4/2014 |
| CN | 103764036 | A | 4/2014 |
| EP | 2690598 | A2 | 1/2014 |
| JP | 2012161444 | A | 8/2012 |
| JP | 201494229 | A | 5/2014 |
| WO | 2013061202 | A2 | 5/2013 |
| WO | 2014065340 | A1 | 5/2014 |

* cited by examiner

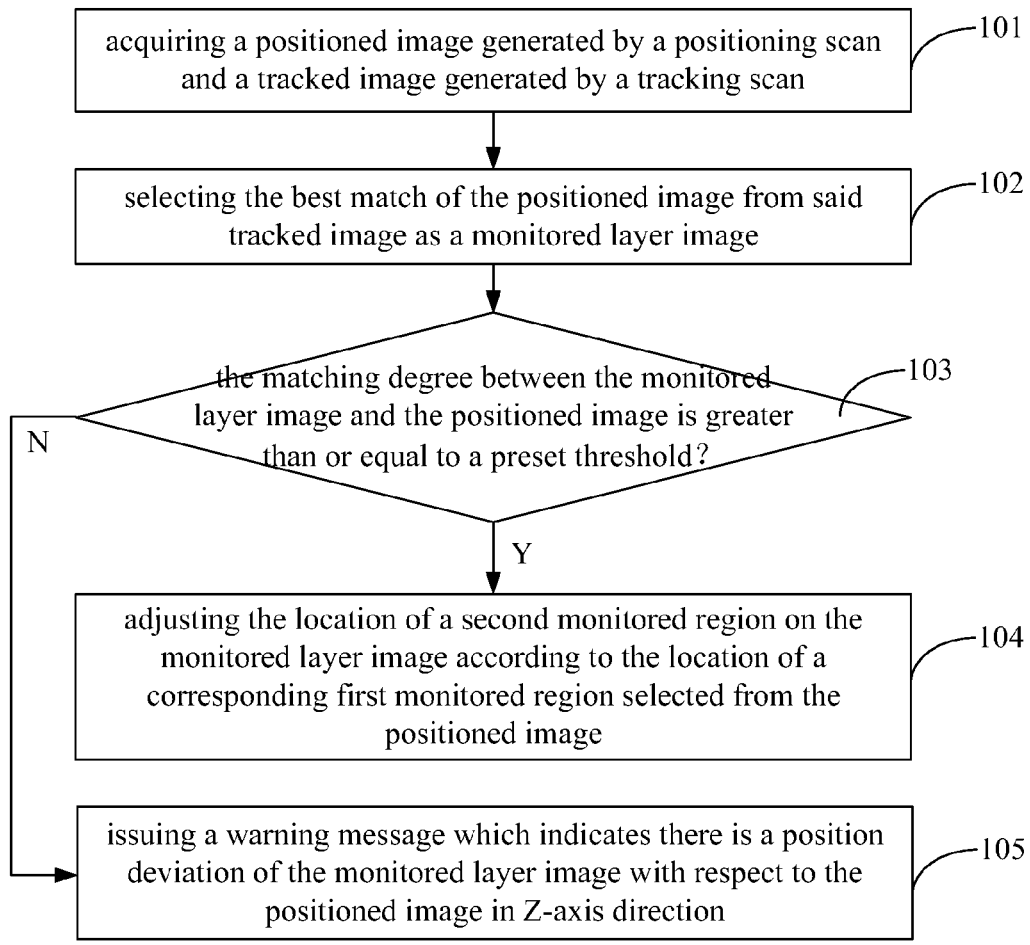
Fig. 1
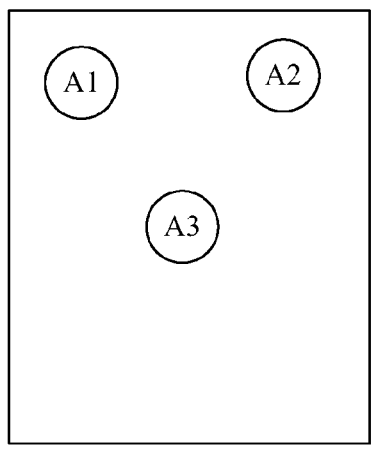 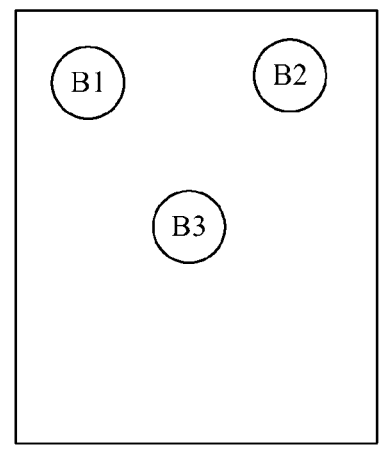
Fig. 2A  Fig. 2B

ADJUSTING MONITORED REGION IN TRACKING SCAN

CROSS-REFERENCE TO RELATED APPLICATIONS

The present application claims priority to Chinese Patent Application No. 201410455262.7 filed on Sep. 9, 2014, the entire contents of which are hereby incorporated by reference for all purposes.

BACKGROUND

Computer Tomography (CT) is a technology for performing sectional scanning with an X-ray beam and a detector around a certain part of the subject (e.g., the patient). A CT scanner can be used for diagnosing and investigating various diseases, with fast scanning time and clear images. In general, before a diagnostic CT scan, it is necessary to perform a positioning scan and a tracking scan.

The positioning scan generally aims to obtain a positioning image by scanning the subject such that a monitored region for tracking scan can be selected on the basis of the positioning image. After completing the positioning scan, ten seconds to several minutes may generally be taken to select the monitored region(s) based on the positioned image. During the tracking scan, if a CT value of a monitored region is measured as achieving a pre-set threshold, a CT diagnostic scan is automatically or manually triggered. Wherein the so called CT value refers to the attenuation value of the X-ray beam after passing through the subject tissue and absorbed thereby.

NEUSOFT MEDICAL SYSTEMS CO., LTD. (NMS), founded in 1998, with its world headquarters in China, is a leading supplier of medical equipment, medical IT solutions, and healthcare services. NMS supplies medical equipment with a wide portfolio, including CT, MRI, digital X-ray machine, Ultrasound, PET (Positron Emission Tomography), Linear Accelerator, and Biochemistry Analyser. Currently, NMS products are exported to over 60 countries and regions around the globe, serving more than 5,000 renowned customers. NMS' latest successful developments, such as 128 Multi-Slice CT Scanner System, Superconducting MRI, Linear Accelerator, and PET products, have led China to become a global high-end medical equipment producer. As an integrated supplier with extensive experience in large medical equipment, NMS has been committed to the study of avoiding secondary potential harm caused by excessive X-ray irradiation to the subject during the CT scanning process. The present disclosure provides a method and device for adjusting a monitored region, also referred to as a monitored area, in a tracking scan to trigger a CT diagnostic scan in time so as to obtain a diagnostic scan image with good quality.

BRIEF DESCRIPTION OF DRAWINGS

Features of the present disclosure are illustrated by way of example and not limited in the following figures, in which like numerals indicate like elements, in which:

FIG. 1 is a flow chart of a method for adjusting a monitored region in a tracking scan according to an example of the present disclosure.

FIG. 2A and FIG. 2B are comparison schematic diagrams of a positioned image and a monitored layer image according to an example of the present disclosure.

DETAILED DESCRIPTION

Figure 3:
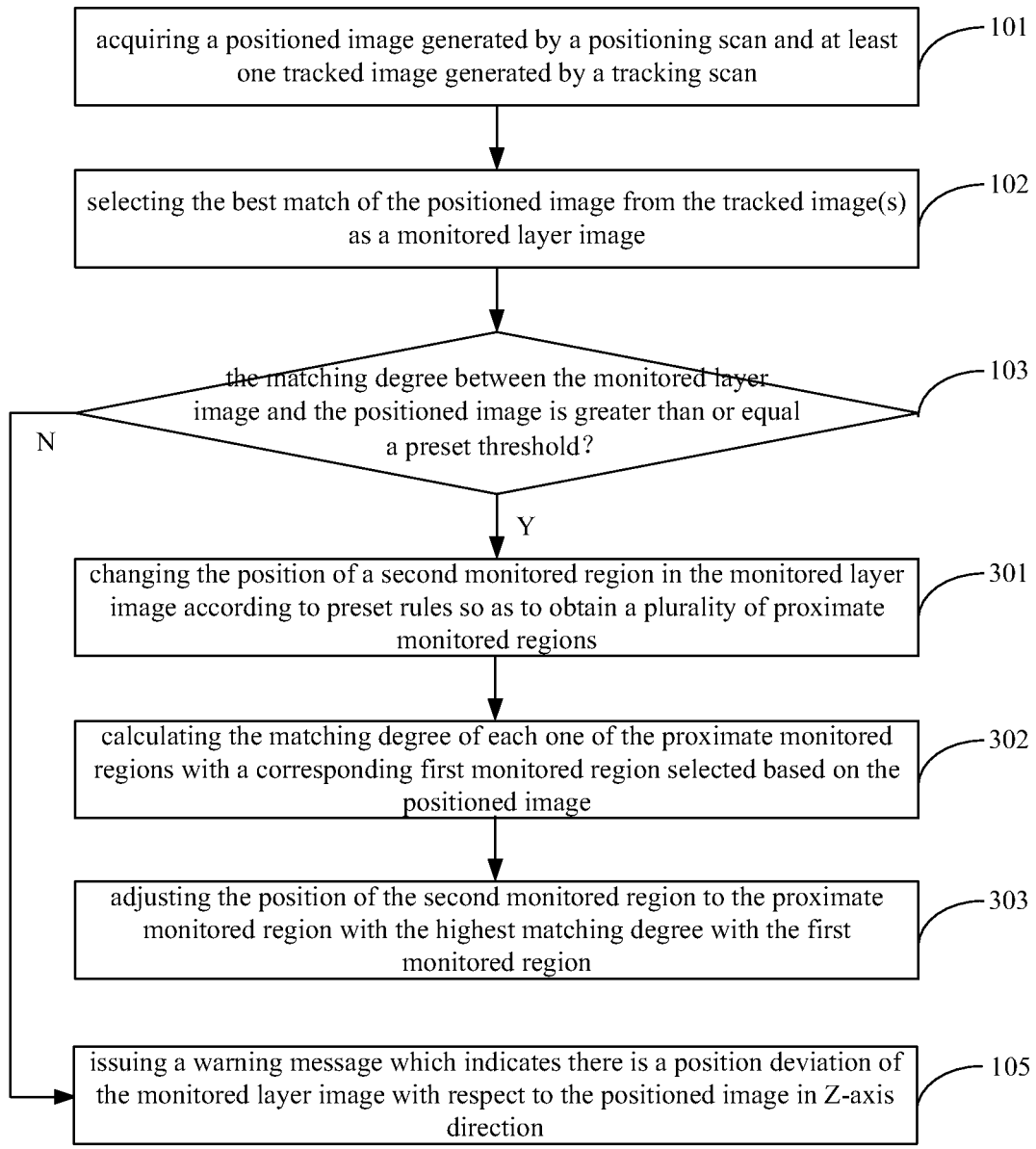
FIG. 3 is a flow chart of a method for adjusting a monitored region in a tracking scan according to another example of the present disclosure.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

As shown in FIG. 1, which is a flow chart of a method for adjusting a monitored region or area in a tracking scan according to an example of the present disclosure, said method includes:

block 101: acquiring a positioned image generated by a positioning scan and a tracked image generated by a tracking scan;

block 102: selecting a best match of the positioned image from the tracked image(s) as a monitored layer image;

block 103: determining whether a matching degree between the monitored layer image and the positioned image is greater than or equal to a pre-set threshold;

block 104: when the matching degree between the monitored layer image and the positioned image is greater than or equal to the pre-set threshold, adjusting the position of a second monitored region or area on the monitored layer image according to the position of a corresponding first monitored region or area selected from the positioned image, wherein the second monitored region is generally configured to trigger a diagnostic scan.

For block 101, prior to the tracking scan, it may generally implement a positioning scan to obtain a positioned image. In other words, a CT scan may be carried out according to a positioning line set by an operator, and the image generated by the CT scan would be the so-called positioned image. The operator may then perform a tracking scan based on a first monitored region which is selected on the positioned image.

Ideally, the tracked image generated by the tracking scan and the positioned image generated by the positioning scan shall be the same. Therefore, in practical application scenarios, a CT diagnostic scan is triggered by monitoring a CT value of a second monitored region in the tracked image which corresponds to a first monitored region selected based on the positioned image. According to an example, the CT value may indicate an attenuation value of X-ray beam which is determined based on the gray scale characteristic values of the image, and the CT diagnostic scan may be triggered in the case that a monitored CT value of the second monitored region is greater than or equal to a pre-set threshold. However, due to heteronomous motions of the subject such as movement or breath, the second monitored region in the tracking scan may shift from the first monitored region selected based on the positioned image. That is, a certain position deviation between the tracked image with respect to the positioned image in a direction perpendicular and/or parallel to a plane in which the positioned image is located may occur, thereby impacting the diagnostic results of a CT scan.

Furthermore, in order to reduce the radiation dose to the subject, the tracking scan may be typically implemented at a certain interval. When the implemented tracking scan is two dimensional, a tracked image parallel to the plane in which the positioned image is located may be generated, and when the implemented tracking scan is three dimensional, a plurality of tracked images parallel to the plane in which the positioned image is located may be generated. It may be set by the operator according to practical situations. Therefore, there may be at least two possible implementations for block 102.

First, if there is only one tracked image, selecting a best match of the positioned image from the tracked image as a monitored layer image may include selecting a unique tracked image as the monitored layer image.

In an example, when the implemented tracking scan is two dimensional, only one tracked image can be obtained for each implementation of the tracking scan. Then, the tracked image is certainly considered the best match of the positioned image, and therefore, selected as the monitored layer image.

Second, if there are a plurality of said tracked images, selecting the best match of the positioned image from the tracked images as a monitored layer image may include calculating the matching degree between each of the tracked images and the positioned image, and then selecting the tracked image with a highest matching degree as the monitored layer image.

In another example, when the implemented tracking scan is three dimensional, a plurality of tracked images may be obtained for each implementation of the tracking scan. According to the present disclosure, it may select the best match of the positioned image from the plurality of tracked images as the monitored layer image, so as to reduce a position deviation of the monitored layer image with respect to the positioned image in the direction perpendicular to the plane in which the positioned image is located (namely the traveling direction of CT operating table and being called as Z-axis direction henceforth) as much as possible.

In this example, it is assumed that due to motions such as breathing of the subject, the position for the tracking scan shifts with respect to the position for the positioning scan in Z-axis direction, then the tracked image having the highest matching degree with the positioned image in Z-axis direction is selected as the monitored layer image. That is, the best match of the positioned image is selected from the plurality of tracked images obtained by the three dimensional tracking scan as the monitored layer image. In this way, the monitored layer image may be considered substantially the same as the positioned image.

In one example, the matching degree of each of the tracked images with the positioned image may be determined on the basis of Euclidean distance between two images. For example, said calculating the matching degree between each of the tracked images and the positioned image may include extracting a gray scale characteristic of each of the tracked images and a gray scale characteristic of said positioned image, and calculating the Euclidean distance between each of the tracked images and the positioned image according to extracted gray scale characteristics so as to determine the matching degrees between each of the tracked images and the positioned image.

When the matching degree between two images is measured by the Euclidean distance, generally, the larger the Euclidean distance, the lower the matching degree, and the smaller the Euclidean distance, the higher the matching degree.

Henceforth, a detailed description will be given about how to calculate the Euclidean distance between a tracked image and a positioned image.

Assuming that the gray scale characteristic of the tracked image is $H_G(k)$, and the gray scale characteristic of the positioned image is $H_D(k)$, then the Euclidean distance between the tracked image and the positioned image may be calculated with formulation (1):

$$P(G, D) = \sqrt{\sum_{k=0}^{T-1} [H_G(k) - H_D(k)]^2}$$

Wherein, the gray scale characteristic H(k) of an image (also referred to as CT value for a CT image), as a parameter for characterizing an image, may indicate the probability of occurrence for each gray scale characteristic in the image. Generally, the range of the levels for a gray scale characteristic is (−1024, 3071), and if it is expressed by T, then T is 4096.

Wherein $$H(k) = \frac{n_k}{N}, k$$

is the level for the gray scale characteristic of the image, k has a value range of (0, T−1), $n_k$ is the number of pixels in the image which exhibit the gray scale characteristic of the level k, and N is the total number of pixels in the image.

As can be known from this, for the gray scale characteristic $$H_G(k) = \frac{n_{kG}}{N_G}$$

of any tracked image, $n_{kG}$ is the number of pixels exhibiting the gray scale characteristic of the level k in the tracked image, $N_G$ is the total number of pixels in the tracked image. For the gray scale $$H_D(k) = \frac{n_{kD}}{N_D}$$

characteristic value of the positioned image, $n_{kD}$ is the number of pixels exhibiting the gray scale characteristic of the level k in the positioned image, and $N_D$ is the total number of pixels in the positioned image.

According to the above-mentioned method, an Euclidean distance between each of the tracked images and the positioned image are calculated, and a tracked image having the smallest Euclidean distance with the positioned image is selected as the tracked image having the highest matching degree with the positioned image. That is, the tracked image having the smallest Euclidean distance with the positioned image is selected as the monitored layer image.

In this example, the block for selecting the best match of the positioned image from the tracked images as the monitored layer image may also adopt all other possible ways in prior art.

For the block 103, when the matching degree between the monitored layer image and the positioned image is greater than or equal to a pre-set threshold, which means the position deviation of the monitored layer image with respect to the positioned image in Z-axis direction may be very small, it thereby deems that the monitored layer image is the same as the positioned image.

When the matching degree between the monitored layer image and the positioned image is smaller than the pre-set threshold, which means the position deviation of the monitored layer image with respect to the positioned image in Z-axis direction is relatively large, it thereby deems that the monitored layer image is not the same as the positioned image.

For the block 104, when it deems that the monitored layer image is the same as the positioned image, the position of a second monitored region on the plane on which the monitored layer image is adjusted (namely the plane perpendicular to the traveling direction of the CT operating table and called as XY plane henceforth) based on the position of a corresponding first monitored region on the positioned image, for example, adjusting the X-axis coordinate value and/or Y-axis coordinate value of the second monitored region such that the second monitored region may be deemed the same as the first monitored region selected based on said positioned image. That is, in the XY plane, the position deviation between the second monitored region and the first monitored region is reduced as much as possible.

In different examples, there may be one or more first monitored regions, and accordingly there may be one or more second monitored regions. In other words, the number of the second monitored regions may be the same as the number of the first monitored regions.

When there are a plurality of first monitored regions and a plurality of corresponding second monitored regions, the position of each second monitored region is adjusted according to the position of the corresponding first monitored region.

As shown in FIG. 2A and FIG. 2B, in an example, FIG. 2A shows a schematic diagram of a positioned image, and FIG. 2B shows a schematic diagram of a monitored layer image. Wherein, A1, A2 and A3 are schematic first monitored regions, B1, B2 and B3 are schematic second monitored regions, a first monitored region A1 corresponds to a second monitored region B1, a first monitored region A2 corresponds to a second monitored region B2, and a first monitored region A3 corresponds to a second monitored region B3. Therefore, the position of second monitored region B1 is adjusted mainly according to the position of first monitored region A1, the position of second monitored region B2 is adjusted mainly according to the position of first monitored region A2, and the position of second monitored region B3 is adjusted mainly according to the position of first monitored region A3.

After adjusting positions of the second monitored region, the CT value of the second monitored region is monitored, and when the CT value of the second monitored region is greater than or equal to a pre-set threshold, a CT diagnostic scan can be automatically or manually triggered.

The block 104 allows reducing the position deviation of a second monitored region of the monitored layer image with respect to a corresponding first monitored region of the positioned image on the scanning plane, such that the second monitored region may be deemed the same as the first monitored region selected based on the positioned image. When the CT value of the second monitored region is greater than or equal to the pre-set threshold, a CT diagnostic scan is started in time. Since the monitored layer image may be deemed the same as the positioned image, and the second monitored region on the monitored layer image may be deemed the same as the first monitored region selected based on the positioned image, the position shifts of monitored regions due to the heteronomous movement such as respiratory movement are effectively reduced, which may prevent advanced or delayed triggering of the CT diagnostic scan thereby ensuring generation of a good quality CT scan image.

In the method of the present disclosure, when the monitored layer image cannot be approximately deemed the same as the positioned image, a warning message may be issued to alert the operator that the position deviation of the monitored layer image with respect to the positioned image shall not to be neglected, and the operator may be instructed to terminate the tracking scan and resume the positioning scan to determine first monitored regions in the positioned image.

In practical application scenarios, the block 105 shown in FIG. 1 is optional. For example, when the matching degree between the monitored layer image and the positioned image is less than a pre-set threshold, it is possible to directly terminate the tracking scan rather than issue a warning message. In other words, block 105 may be selectively executed according to practical requirements and the present disclosure will not define it specifically.

With the method of the present disclosure, by selecting the best match of the positioned image from the tracked images as the monitored layer image, the position deviation of the second monitored region with respect to the corresponding first monitored region in Z-axis direction may be reduced as much as possible. On the other hand, by adjusting the position of the second monitored region according to the position of the corresponding first monitored region, the position deviation of the second monitored region with respect to the first monitored region in XY plane parallel to the plane on which the positioned image is located may be reduced. In this way, it is effectively guaranteed that the position deviation of the second monitored region in the monitored layer image with respect to the corresponding first monitored region selected based on the positioned image may be neglected, and thereby the CT diagnostic scan may be triggered in time so as to obtain a diagnostic scan image with good quality.

FIG. 3 is a flow chart of a method for adjusting a monitored region in a tracking scan according to another example of the present disclosure. As shown in FIG. 3, said method may include:

block 101: acquiring a positioned image generated by a positioning scan and a tracked image generated by a tracking scan;

block 102: selecting the best match of the positioned image from the tracked image(s) as a monitored layer image;

block 103: determining whether the matching degree between the monitored layer image and the positioned image is greater than or equal a pre-set threshold, and if so, the process proceeds to block 301; if not, the process proceeds to block 105;

block 301: changing the position of a second monitored region in the monitored layer image according to a pre-set rule so as to obtain a plurality of proximate monitored regions, wherein the second monitored region is mainly used to trigger a CT diagnostic scan;

block 302: calculating the matching degree of each of the proximate monitored regions with a corresponding first monitored region selected based on the positioned image;

block 303: adjusting the position of the second monitored region to the proximate monitored region with the highest matching degree with the first monitored region;

block 105: issuing a warning message which indicates there is a position deviation of the monitored layer image with respect to the positioned image in the direction perpendicular to the plane on which the positioned image is located.

As can be seen by comparing FIGS. 1 and 3, the present example differs from the previous one mainly in that, the block 104 may specifically include blocks 301~303 to adjust the second monitored region to be the proximate monitored region having the highest matching degree with the first monitored region. Since the other blocks are the same, they will not be described anymore here.

In an example, when the first monitored region and the second monitored region are of circular shape, the block 301 may include: modifying abscissa (i.e., value of a coordinate on the horizontal axis) of the center of the second monitored region in a first pre-set range according to a first pre-set interval to obtain a plurality of first proximate abscissas, modifying the ordinate (value of a coordinate on the vertical axis) of the center of the second monitored region in the first pre-set range according to the first pre-set interval to obtain a plurality of first proximate ordinates, and combining each of the first proximate abscissas with each of the first proximate ordinates into a plurality of proximate center coordinates, and forming a plurality of proximate monitored regions based on each of the proximate center coordinates and a fixed radius of the second monitored region.

Generally speaking, assuming the center coordinate of one first monitored region in the positioned image is $(x_0, y_0)$, then theoretically, the center coordinate of the corresponding second monitored region in the monitored layer image shall be $(x_0, y_0)$ also. In the previous example, the concept of the second monitored region corresponding to the first monitored region has been described in detail, and it will not be described anymore here. However, due to a possible position deviation caused by heteronomous movements such as breathing, the second monitored region may not be the best match of the first monitored region.

Then, assuming the first pre-set range is 2m pixels, a value range for the first proximate abscissas is $-m+x_0 \leq x \leq m+x_0$, and a first pre-set interval is $l_1$, then the plurality of first proximate abscissas obtained by modifying the abscissa of the center of the second monitored region according to the first pre-set interval are $-m+x_0$, $-m+x_0+l_1$, $-m+x_0+2l_1$, . . . $-m+x_0+kl_1$, wherein $$k = \frac{2m}{l_1}.$$

In this way, k first proximate abscissas are obtained totally.

Similarly, the value range for the first proximate ordinates is $-m+y_0 \leq y \leq m+y_0$ and the plurality of first proximate ordinates obtained by modifying the ordinate of the center of the second monitored region according to the first pre-set interval are $-m+y_0$, $-m+y_0+l_1$, $-m+y_0+2l_1$ . . . $-m+y_0+kl_1$, that is, k first proximate ordinates are obtained totally.

In the case that both the first monitored region and the second monitored region are of circular shape, modifying abscissas and ordinates of their centers with the same pre-set interval in the same pre-set range as described above is mainly to ensure the plurality of obtained proximate monitored regions distributed around the second monitored region uniformly, and thus easy to find out the best match of the first monitored region. Of course, it is also possible to use different pre-set intervals or use different pre-set ranges for the abscissa and ordinate with implementing methods similar to the above, which will not be described in detail anymore here.

The k first proximate abscissas and the k first proximate ordinates are combined respectively to obtain $k^2$ proximate center coordinates, and then $k^2$ proximate monitored regions may be obtained accordingly by combining the $k^2$ proximate center coordinates with the fixed radius of the second monitored region as the radius of each proximate monitored region.

In an example, assuming the center coordinate of a second monitored region is (0, 0), it should be understood that the abscissa and ordinate of the center may be identical or different. Herein, point (0, 0) is taken as the center coordinate for convenience of description. The first pre-set range is $-10 \leq x \leq 10$, the first pre-set interval is 2, and the obtained first proximate abscissas by modifying the abscissa of center of the second monitored region in the range of 20 pixels for every two pixels are: −10, −8, −6, −4, −2, 2, 4, 6, 8, and 10, which are 10 first proximate abscissas totally.

Similarly, by modifying the ordinate of center of the second monitored region in the range of 20 pixels for every two pixels, 10 first proximate ordinates are obtained: −10, −8, −6, −4, −2, 2, 4, 6, 8, and 10.

Each of the first proximate abscissas are combined with each of the first proximate ordinates and 100 proximate center coordinates are obtained: (−10,−10), (−10,−8), (−10,−6), (−10,−4), (−10,−2), (−10,2), (−10,4), (−10,6), (−10,8), (−10,10); (−8,−10), (−8,−8), (−8,−6), (−8,−4), (−8,−2), (−8,2), (−8,4), (−8,6), (−8,8), (−8,10); (−6,−10), (−6,−8), (−6,−6), (−6,−4), (−6,−2), (−6,2), (−6,4), (−6,6), (−6,8), (−6,10); (−4,−10), (−4,−8), (−4,−6), (−4,−4), (−4,−2), (−4,2), (−4,4), (−4,6), (−4,8), (−4,10); (−2,−10), (−2,−8), (−2,−6), (−2,−4), (−2,−2), (−2,2), (−2,4), (−2,6), (−2,8), (−2,10); (2,−10), (2,−8), (2,−6), (2,−4), (2,−2), (2,2), (2,4), (2,6), (2,8), (2,10); (4,−10), (4,−8), (4,−6), (4,−4), (4,−2), (4,2), (4,4), (4,6), (4,8), (4,10); (6,−10), (6,−8), (6,−6), (6,−4), (6,−2), (6,2), (6,4), (6,6), (6,8), (6,10); (8,−10), (8,−8), (8,−6), (8,−4), (8,−2), (8,2), (8,4), (8,6), (8,8), (8,10); (10,−10), (10,−8), (10,−6), (10,−4), (10,−2), (10,2), (10,4), (10,6), (10,8), (10, 10).

There are 100 proximate monitored regions formed with the above-mentioned 100 center coordinates as the centers of the proximate monitored regions and the fixed radius of the second monitored region as the radius of the proximate monitored regions.

It is to be noted that the above-mentioned examples are only for better illustrating the method according to the present disclosure and are not limiting the present disclosure for practical application. When there are a plurality of first monitored regions and a plurality of corresponding second monitored regions, the above-mentioned method may be applied to each of the second monitored regions.

In another example, when the first monitored region and the second monitored region are of ellipse shape, the block 301 may include: modifying the abscissa of the center point in the second monitored region within a second pre-set range according to a second pre-set interval to obtain a plurality of second proximate abscissas, modifying the ordinate of the center point in the second monitored region within a third pre-set range according to the second pre-set interval to obtain a plurality of second proximate ordinates, combining each of the second proximate abscissas with each of the second proximate ordinates as a proximate center coordinate, and forming a plurality of proximate monitored regions based on each of the proximate center coordinates and a fixed long axis and fixed short axis of the second monitored region. Wherein, when the long axis of the second monitored region is on the horizontal axis, the ratio of the second pre-set range to the third pre-set range may be the ratio of the long axis to the short axis of the second monitored region; while when the long axis of the second monitored region is on the vertical axis, the ratio of the second pre-set range to the third pre-set range may be the ratio of the short axis to the long axis of the second monitored region.

Generally speaking, assuming the center coordinate of a first monitored region is $(x'_0, y'_0)$, then the center coordinate of the corresponding second monitored region shall be $(x'_0, y'_0)$ theoretically. Now, assuming the second pre-set range is 2n pixels, the value range for the second proximate abscissas is $-n+x'_0 \leq x \leq n+x'_0$, and the second pre-set interval is $l_2$, then the plurality of second proximate abscissas obtained by modifying the abscissa of the center point in the second monitored region according to the second pre-set interval are $-n+x'_0, -n+x'_0+l_2, -n+x'_0+2l_2 \ldots -n+x'_0+hl_2$, wherein $$h = \frac{2n}{l_2}.$$

That is, h second proximate abscissas are obtained totally.

Assuming the third pre-set range is 2p pixels, the value range for the second proximate ordinate is $-p+y'_0 \leq y \leq p+y'_0$, the second pre-set interval is $l_2$, and the plurality of second proximate ordinates obtained by modifying the ordinate of the center point of the second monitored region according to the second pre-set interval are: $-p+y'_0, -p+y'_0+l_2, -p+y'_0+2l_2 \ldots -p+y'_0+jl_2$, wherein $$j = \frac{2p}{l_2}.$$

That is, j second proximate ordinates are obtained totally.

It is to be noted that, when the long axis of the second monitored region is on the horizontal axis, the ratio of the second pre-set range to the third pre-set range may be the ratio of the long axis a to the short axis b of the second monitored region $$\frac{2n}{2p} = \frac{a}{b};$$

when the long axis of the second monitored region is on the vertical axis, the ratio of the second pre-set range to the third pre-set range may be the ratio of the short axis b to the long axis a of the second monitored region $$\frac{2n}{2p} = \frac{b}{a}.$$

In the case both the first monitored region and the second monitored region are of ellipse shape, modifying abscissas and ordinates of their center points with the same pre-set interval in the same pre-set range as described above is mainly to ensure the plurality of obtained proximate monitored regions distribute around the second monitored region uniformly, and thus easy to find out the best match of the first monitored regions. Of course, according to practical situations, it is also possible to use different pre-set intervals and/or different pre-set ranges for the abscissa and ordinate with implementing methods similar to the above, which will not be described in detail anymore here.

The h second proximate abscissas and the j second proximate ordinates are combined respectively to obtain hj proximate center coordinates, and then hj proximate monitored regions may be obtained accordingly by combining the hj proximate center coordinates with the fixed long axis and the fixed short axis of the first monitored region as the long axis and short axis of the proximate monitored regions respectively. The combining mode is the similar as described in the above examples and will not be described anymore here. When there are a plurality of first monitored regions and a plurality of corresponding second monitored regions, the above-mentioned method may be applied to each of the second monitored regions.

In addition, the first monitored region and the second monitored region may also be of other shapes such as rectangle, diamond and square, and a plurality of proximate monitored regions are obtained while considering angles, which is not described in detail here.

For the above-mentioned block 302, the matching degree calculating method adopted may be similar to that in block 102. In an example, the block 302 may specifically include: extracting gray scale characteristics of each of the proximate monitored regions and gray scale characteristics of the first monitored regions, calculating an Euclidean distance between each of proximate monitored regions and the first monitored region according to the extracted gray scale characteristics, and determining matching degrees between each of the proximate monitored regions and the first monitored region based on the calculated Euclidean distances.

Wherein, the method for calculating the Euclidean distance between each of the proximate monitored regions and the first monitored region is similar to the method used in block 102, and will not be described anymore here.

Since the proximate monitored region having the highest matching degree with respect to the first monitored region is the best match of the first monitored regions, adjusting the position of the second monitored region to the best match proximate monitored region is essentially taking the best match proximate monitored region as the second monitored region. Therefore, the position deviation of the second monitored region with respect to the first monitored region in the XY plane due to heteronomous movements such as breathing is effectively reduced, the second monitored region obtained by the tracking scan can be deemed approximately the first monitored region selected based on the positioned image and is the region interested by the operator indeed, and thereby a CT diagnostic scan can be triggered in time by monitoring the CT value of the second monitored region and so as to obtain a diagnostic scan image with good quality.

Figure 4:
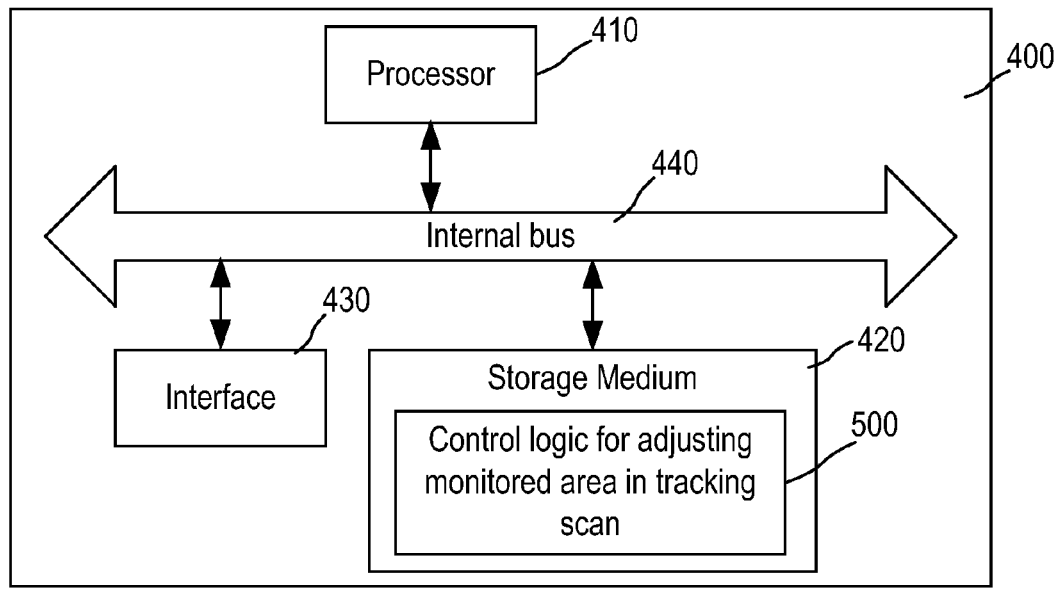
FIG. 4 is a schematic diagram of a hardware architecture of a device for adjusting a monitored region in a tracking scan according to an example of the present disclosure.

FIG. 4 is a schematic diagram of the hardware architecture of a device for adjusting monitored region in tracking scan according to the present disclosure. The device 400 may include a processor (such as a CPU) 410 and a machine readable storage medium 420, wherein the processor 410 and the machine readable storage medium 420 are generally interconnected via an internal bus 440. In other possible implementations, the device may further include an external interface 430 to be able to communicate with other equipment or components.

In different examples, the machine readable storage medium 420 may be any electronic, magnetic, optical or other physical storage device. For example, the machine readable storage medium 420 may be RAM (Random Access Memory), volatile memory, non-volatile memory, flash memory, memory drive (such as hard disk drive), solid state hard disk, any type of memory disc (such as optical disk, DVD etc.) or similar storage medium or combination thereof.

Figure 5:
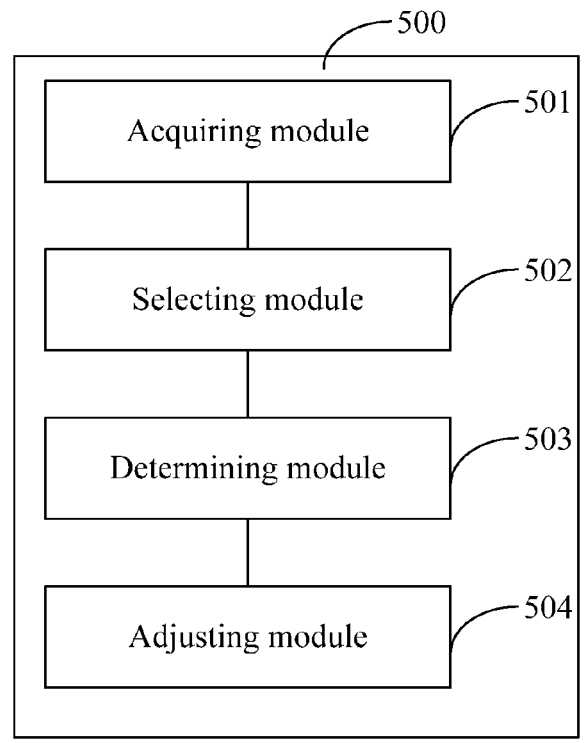
FIG. 5 is a schematic diagram of functional modules of control logic for adjusting a monitored region in a tracking scan corresponding to the example shown in FIG. 1.

Furthermore, the machine readable storage medium 420 has machine readable instructions control logic 500 for adjusting a monitored region in a tracking scan stored thereon. As shown in FIG. 5, which is a schematic diagram of functional modules of the control logic for adjusting monitored region in tracking scan correspond to the method shown in FIG. 1, functionally, said control logic 500 for adjusting monitored region in a tracking scan may include an acquiring module 501, a selecting module 502, a determining module 503, and an adjusting module 504.

The acquiring module 501 is mainly configured to acquire the positioned image obtained by a positioning scan and a tracked image obtained by a tracking scan.

The selecting module 502 is mainly configured to select said best match of the positioned image from said tracked image as a monitored layer image.

In an example, when there is only one tracked image, said selecting module 502 may include a first selecting submodule for selecting the unique tracked image as the monitored layer image. However, according to another example, in case there are a plurality of tracked images, said selecting module 502 may include a first calculating submodule for calculating matching degrees between each of the tracked images and the positioned image, and a selecting submodule for selecting the tracked image with the highest matching degree as the monitored layer image, wherein, the first calculating submodule may further include an extracting sub-submodule for extracting gray scale characteristics of each of the tracked images and gray scale characteristics of the positioned image, and a determining sub-submodule for calculating Euclidean distances between each of the tracked images and the positioned image according to the extracted gray scale characteristics and determining the matching degrees between each of the tracked images and the positioned image according to said Euclidean distances.

The determining module 503 is mainly configured to determine whether the matching degree between the monitored layer image and the positioned image is greater than or equal to a pre-set threshold.

The adjusting module 504 is mainly configured to, when the matching degree between the monitored layer image and the positioned image is greater than or equal to the pre-set threshold, adjusting the position of a second monitored region on the monitored layer image according to the position of a corresponding first monitored region on the positioned image, wherein the first monitored region is selected based on the positioned image, and the second monitored region is configured to trigger a CT diagnostic scan.

In another possible example, said control logic for adjusting a monitored region in a tracking scan may further include a warning module configured to, when the matching degree between the monitored layer image and the positioned image is less than a pre-set threshold, issue a warning message to indicate the position deviation of the monitored layer image with respect to the positioned image in the direction perpendicular to the positioned image shall not to be neglected.

Figure 6:
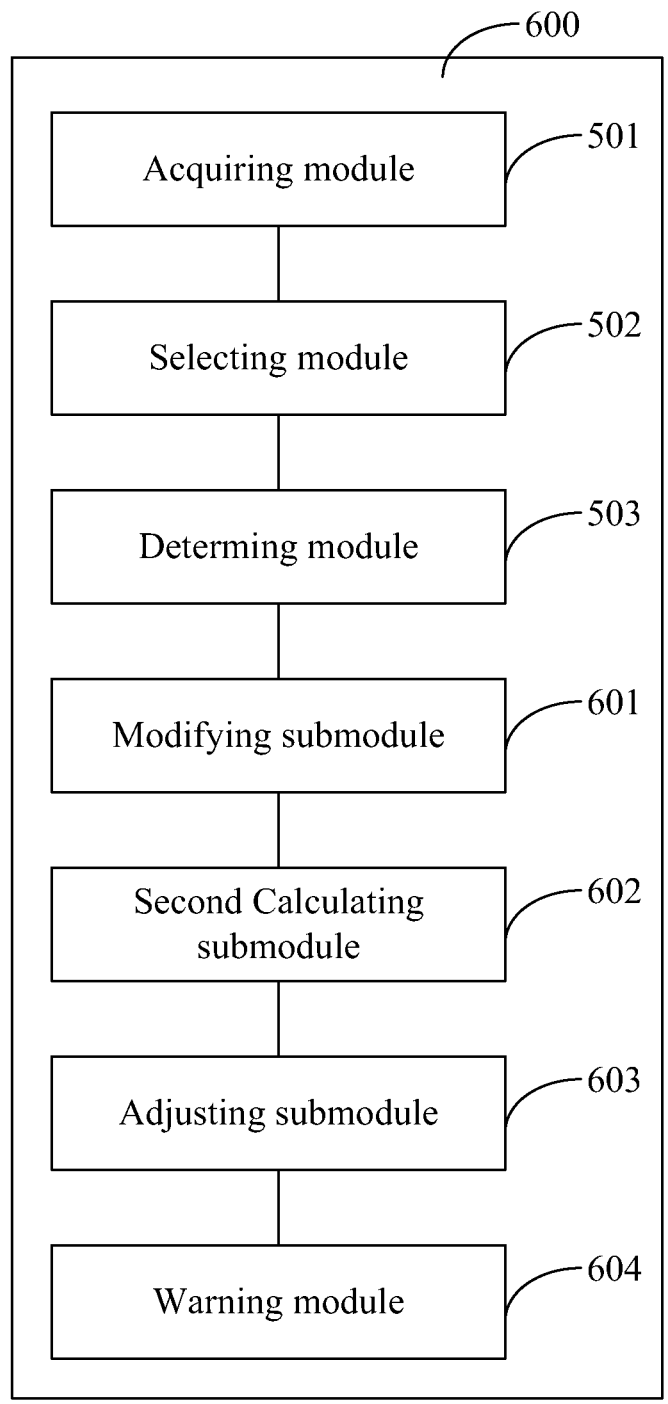
FIG. 6 is a schematic diagram of functional modules of control logic for adjusting a monitored region in a tracking scan corresponding to the example shown in FIG. 3.

FIG. 6 is a schematic diagram of functional modules of control logic for adjusting a monitored region in a tracking scan corresponding to the example shown in FIG. 3. As shown in FIG. 6, functionally, said control logic for adjusting monitored a region in a tracking scan may include an acquiring module 501, a selecting module 502, a determining module 503, a modifying submodule 601, a second calculating submodule 602, an adjusting submodule 603 and a warning module 604. As can be seen by comparing with FIG. 5, the control logic 600 shown in FIG. 6 is mainly different from the control logic 500 shown in FIG. 5 in that, the adjusting module 504 shown in FIG. 5 includes a modifying submodule 601, a second calculating submodule 602 and an adjusting submodule 603.

The modifying submodule 601 is configured to, when the matching degree between the monitored layer image and the positioned image is greater than or equal to the pre-set threshold, modify the position of the second monitored region on the monitored layer image according to a pre-set rule to obtain a plurality of proximate monitored regions.

When the first monitored region and the second monitored region are both of circular shape, the modifying submodule 601 may include a first modifying sub-submodule for modifying the abscissa of the center of the second monitored region within a first pre-set range according to a first pre-set interval to obtain a plurality of first proximate abscissas, a second modifying sub-submodule for modifying the ordinate of the center of the second monitored region within the first pre-set range according to the first pre-set interval to obtain a plurality of first proximate ordinates, and a first combining sub-submodule for combining each of the first proximate abscissas with each of the first proximate ordinates as a proximate center coordinate and forming a plurality of proximate monitored regions based on each of the proximate center coordinates and the fixed radius of the second monitored region.

When the first monitored region and the second monitored region are both of ellipse shape, the modifying submodule 601 may include a third modifying sub-submodule for modifying the abscissa of the center point in the second monitored region within a second pre-set range according to a second pre-set interval to obtain a plurality of second proximate abscissas, a fourth modifying sub-submodule for modifying the ordinate of the center point in the second monitored region within a third pre-set range according to the second pre-set interval to obtain a plurality of second proximate ordinates, and a second combining sub-submodule for combining each of the second proximate abscissas with each of the second proximate ordinates as a proximate center coordinate and forming a plurality of proximate monitored regions based on each of the proximate center coordinates and the fixed long axis and fixed short axis of the second monitored regions. Wherein, when the long axis of the second monitored region is on the horizontal axis, the ratio of the second pre-set range to the third pre-set range may be the ratio of the long axis to the short axis of the second monitored region; and when the long axis of the second monitored region is on the vertical axis, the ratio of the second pre-set range to the third pre-set range may be the ratio of the short axis to the long axis of the second monitored region.

The second calculating submodule 602 is mainly configured to calculate the matching degree between each of the proximate monitored regions and the first monitored region.

The adjusting submodule 603 is mainly configured to adjust the position of the second monitored region to the proximate monitored region having the highest matching degree with the first monitored region, and such that the position deviation of the second monitored region with respect to the first monitored region in XY plane parallel to the plane on which said positioned image is located can be reduced as much as possible.

Henceforth, a software implementation is taken as an example to further describe how the device running the control logic 500 for adjusting a monitored region in a tracking scan operates. In this example, the control logic 500 in the present disclosure should be understood as code instructions stored in the machine readable storage medium 420. When the processor 410 on the device of the present disclosure executes the control logic 500, the processor 410 carries out the following operations by reading instructions of corresponding functional modules of the control logic 500 of the present disclosure stored on the machine readable storage medium 420:

acquiring the positioned image obtained by a positioning scan and a tracked image obtained by a tracking scan;

selecting a best match of the positioned image from said tracked image as a monitored layer image;

determining whether the matching degree between the monitored layer image and the positioned image is greater than or equal to a pre-set threshold;

when the matching degree between the monitored layer image and the positioned image is greater than or equal to the pre-set threshold, adjusting the position of a second monitored region on the monitored layer image according to the position of a corresponding first monitored region selected from the positioned image, wherein the second monitored region is configured to trigger a CT diagnostic scan.

The instructions further cause the processor to: when there is only one tracked image, select the unique tracked image as the monitored layer image.

The instructions further cause the processor to:

calculate the matching degree between each of the tracked images and the positioned image;

select the tracked image with the highest matching degree as the monitored layer image.

The instructions further cause the processor to:

extract gray scale characteristics of each of the tracked images and gray scale characteristics of the positioned image;

calculate Euclidean distances between each of the tracked images and the positioned image according to the extracted gray scale characteristics; and determine the matching degrees between each of the tracked images and the positioned image based on the calculated Euclidean distances.

The instructions further cause the processor to:

modify the position of the second monitored region according to a pre-set rule to obtain a plurality of proximate monitored regions;

calculate the matching degrees between each of the proximate monitored regions and the first monitored region; and adjust the position of the second monitored region to the proximate monitored region with the highest matching degree with the first monitored region.

When the first monitored region and the second monitored region are of circle shape, the instructions further cause the processor to:

modify the abscissa of the center point of the second monitored region within a first pre-set range according to a first pre-set interval to obtain a plurality of first proximate abscissas;

modify the ordinate of the center point of the second monitored region within the first pre-set range according to the first pre-set interval to obtain a plurality of first proximate ordinates;

combine each of the first proximate abscissas with each of the first proximate ordinates as a proximate center coordinate; and form a plurality of proximate monitored regions based on each of the proximate center coordinate and the fixed radius of the second monitored region.

When the first monitored region and the second monitored region are of ellipse shape, the instructions further cause the processor to:

modify the abscissa of the center point in the second monitored region within a second pre-set range according to a second pre-set interval to obtain a plurality of second proximate abscissas;

modify the ordinate of the center point in the second monitored region within a third pre-set range according to the second pre-set interval to obtain a plurality of second proximate ordinates;

combine each of the second proximate abscissas with each of the second proximate ordinates as a proximate center coordinate; and form a plurality of proximate monitored regions based on each of the proximate center coordinates and the fixed long axis and fixed short axis of the second monitored region;

wherein, when the long axis of the second monitored region is on the horizontal axis, the ratio of the second pre-set range to the third pre-set range may be the ratio of the long axis to the short axis of the second monitored region; and when the long axis of the second monitored region is on the vertical axis, the ratio of the second pre-set range to the third pre-set range may be the ratio of the short axis to the long axis of the second monitored region.

When the matching degree between the monitored layer image and the positioned image is less than the pre-set threshold, the instructions further cause the processor to: issue a warning alert to indicate the position deviation of the monitored layer image with respect to the positioned image in the direction perpendicular to the plane on which the positioned image is located shall not to be neglected.

The above are only preferred examples of the present disclosure and are not intended to limit the disclosure. Within the spirit and principles of the present disclosure, any changes made, equivalent replacement, or improvement in the protection of the present disclosure should contain within the range.

The methods, processes and units described herein may be implemented by hardware (including hardware logic circuitry), software, or firmware or a combination thereof. The term "processor" is to be interpreted broadly to include a processing unit, ASIC, logic unit, or programmable gate array, etc. The processes, methods and functional units may all be performed by the one or more processors; reference in this disclosure or the claims to a "processor" should thus be interpreted to mean "one or more processors".

Further, the processes, methods and functional units described in this disclosure may be implemented in the form of a computer software product. The computer software product is stored in a storage medium and comprises a plurality of instructions for making a processor to implement the methods recited in the examples of the present disclosure.

The figures are only illustrations of an example, wherein the units or procedure shown in the figures are not necessarily essential for implementing the present disclosure. Those skilled in the art will understand that the units in the device in the example can be arranged in the device in the examples as described, or can be alternatively located in one or more devices different from that in the examples. The units in the examples described can be combined into one module or further divided into a plurality of sub-units.

Although the flowcharts described show a specific order of execution, the order of execution may differ from that which is depicted. For example, the order of execution of two or more blocks may be changed relative to the order shown. Also, two or more blocks shown in succession may be executed concurrently or with partial concurrence. All such variations are within the scope of the present disclosure.

Throughout the present disclosure, the word "comprise", or variations such as "comprises" or "comprising", will be understood to imply the inclusion of a stated element, integer or step, or group of elements, integers or steps, but not the exclusion of any other element, integer or step, or group of elements, integers or steps.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A method for adjusting a monitored region in a tracking scan, comprising:
   acquiring a positioned image obtained by a positioning scan and a tracked image obtained by a tracking scan;
   selecting a best match of the positioned image from said tracked image as a monitored layer image;
   determining whether a matching degree between the monitored layer image and the positioned image is greater than or equal to a pre-set threshold; and
   when the matching degree between the monitored layer image and the positioned image is greater than or equal to the pre-set threshold, adjusting a position of a second monitored region on the monitored layer image according to a position of a corresponding first monitored region selected from the positioned image, wherein the second monitored region is configured to trigger a CT diagnostic scan.

2. The method according to claim 1, wherein, when there is only one tracked image, said selecting the best match of the positioned image from the tracked image(s) as the monitored layer image comprises:
   selecting a unique tracked image as the monitored layer image.

3. The method according to claim 1, wherein, when there are a plurality of tracked images, said selecting the best match of the positioned image from the tracked image(s) as the monitored layer image comprises:
   calculating matching degrees between each of the tracked images and the positioned image; and
   selecting the tracked image with a highest matching degree as the monitored layer image.

4. The method according to claim 3, wherein, said calculating the matching degrees between each of the tracked images and the positioned image comprises:
   extracting gray scale characteristics of each of the tracked images and the positioned image;
   calculating Euclidean distances between each of the tracked images and the positioned image according to extracted gray scale characteristics; and
   determining the matching degrees between each of the tracked images and the positioned image based on calculated Euclidean distances.

5. The method according to claim 1, wherein, said adjusting the position of a second monitored region on the monitored layer image according to the position of a corresponding first monitored region selected from the positioned image comprises:
   modifying the position of the second monitored region according to a pre-set rule to obtain a plurality of proximate monitored regions;
   calculating the matching degrees between each of the proximate monitored regions and the first monitored region; and
   adjusting the position of the second monitored region to the proximate monitored region having the highest matching degree with the first monitored region.

6. The method according to claim 5, wherein, when the first monitored region and the second monitored region are of circle shape, said modifying the position of the second monitored region according to a pre-set rule to obtain a plurality of proximate monitored regions comprises:
   modifying the abscissa of the center of the second monitored region within a first pre-set range according to a first pre-set interval to obtain a plurality of first proximate abscissas;
   modifying the ordinate of the center of the second monitored region within the first pre-set range according to the first pre-set interval to obtain a plurality of first proximate ordinates;
   combining each of the first proximate abscissas with each of the first proximate ordinates to obtain a plurality of proximate center coordinates; and
   forming a plurality of proximate monitored regions based on each of the proximate center coordinates and the fixed radius of the second monitored region.

7. The method according to claim 5, wherein, when the first monitored region and the second monitored region are of ellipse shape, said modifying the position of the second monitored region according to a pre-set rule to obtain a plurality of proximate monitored regions comprises:
   modifying the abscissa of the center point in the second monitored region within a second pre-set range according to a second pre-set interval to obtain a plurality of second proximate abscissas;
   modifying the ordinate of the center point in the second monitored region within a third pre-set range according to the second pre-set interval to obtain a plurality of second proximate ordinates;
   combining each of the second proximate abscissas with each of the second proximate ordinates to obtain a plurality of proximate center coordinates; and forming a plurality of proximate monitored regions based on each of the proximate center coordinates and the fixed long axis and fixed short axis of the second monitored region;
wherein, when the long axis of the second monitored region is on the horizontal axis, the ratio of the second pre-set range to the third pre-set range is the ratio of the long axis to the short axis of the second monitored region; and when the long axis of the second monitored region is on the vertical axis, the ratio of the second pre-set range to the third pre-set range is the ratio of the short axis to the long axis of the second monitored region.

8. The method according to claim 1, further comprising:
when the matching degree between the monitored layer image and the positioned image is less than the pre-set threshold, issuing a warning alert to indicate the position deviation of the monitored layer image with respect to the positioned image in the direction perpendicular to the plane on which the positioned image is located will not be neglected.

9. A device for adjusting a monitored region in a tracking scan, comprising a processor which invokes a non-transitory storage medium storing machine readable instructions of control logic for adjusting monitored region in tracking scan to:
acquire a positioned image obtained by a positioning scan and a tracked image obtained by a tracking scan;
select a best match of the positioned image from said tracked image as a monitored layer image;
determine whether a matching degree between the monitored layer image and the positioned image is greater than or equal to a pre-set threshold; and
when the matching degree between the monitored layer image and the positioned image is greater than or equal to the pre-set threshold, adjust the position of a second monitored region on the monitored layer image according to the position of a corresponding first monitored region selected from the positioned image, wherein the second monitored region is configured to trigger a CT diagnostic scan.

10. The device according to claim 9, wherein said machine readable instructions further cause the processor to:
when there is only one tracked image, select a unique tracked image as the monitored layer image.

11. The device according to claim 9, wherein said machine readable instructions further cause the processor to:
when there are a plurality of tracked images, calculate matching degrees between each of the tracked images and the positioned image; and
select the tracked image with a highest matching degree as the monitored layer image.

12. The device according to claim 11, wherein said machine readable instructions further cause the processor to:
extract gray scale characteristics of each of the tracked images and the positioned image;
calculate Euclidean distances between each of the tracked images and the positioned image according to the extracted gray scale characteristics; and
determine the matching degrees between each of the tracked images and the positioned image based on calculated Euclidean distances.

13. The device according to claim 9, wherein said machine readable instructions further cause the processor to:

modify the position of the second monitored region according to a pre-set rule to obtain a plurality of proximate monitored regions;
calculate the matching degrees between each of the proximate monitored regions and the first monitored region; and
adjust the position of the second monitored region to the proximate monitored region having the highest matching degree with the first monitored region.

14. The device according to claim 13, wherein, said machine readable instructions further cause the processor to:
when the first monitored region and the second monitored region are of circle shape, modify the abscissa of the center of the second monitored region within a first pre-set range according to a first pre-set interval to obtain a plurality of first proximate abscissas;
modify the ordinate of the center of the second monitored region within the first pre-set range according to the first pre-set interval to obtain a plurality of first proximate ordinates;
combine each of the first proximate abscissas with each of the first proximate ordinates to obtain a plurality of proximate center coordinates; and
form a plurality of proximate monitored regions based on each of the proximate center coordinates and the fixed radius of the second monitored region.

15. The device according to claim 13, wherein said machine readable instructions further cause the processor to:
when the first monitored region and the second monitored region are of ellipse shape, modify the abscissa of the center point in the second monitored region within a second pre-set range according to a second pre-set interval to obtain a plurality of second proximate abscissas;
modify the ordinate of the center point in the second monitored region within a third pre-set range according to the second pre-set interval to obtain a plurality of second proximate ordinates;
combine each of the second proximate abscissas with each of the second proximate ordinates to obtain a plurality of proximate center coordinates; and
form a plurality of proximate monitored regions based on each of the proximate center coordinates and the fixed long axis and fixed short axis of the second monitored region;
wherein, when the long axis of the second monitored region is on the horizontal axis, the ratio of the second pre-set range to the third pre-set range is the ratio of the long axis to the short axis of the second monitored region; and when the long axis of the second monitored region is on the vertical axis, the ratio of the second pre-set range to the third pre-set range is the ratio of the short axis to the long axis of the second monitored region.

16. The device according to claim 9, wherein said machine readable instructions further cause the processor to:
when the matching degree between the monitored layer image and the positioned image is less than the pre-set threshold, issuing a warning alert to indicate a position deviation of the monitored layer image with respect to the positioned image in a direction perpendicular to the plane on which the positioned image is located will not to be neglected.

* * * * *